United States Patent [19]
McKeever

[11] Patent Number: 6,070,880
[45] Date of Patent: Jun. 6, 2000

[54] SYSTEM FOR LUBRICATING MECHANICAL SEALS

[75] Inventor: James F. McKeever, Lisburn, United Kingdom

[73] Assignee: Sealtec MCK Limited, Belfast, United Kingdom

[21] Appl. No.: 08/970,401

[22] Filed: Nov. 14, 1997

Related U.S. Application Data

[63] Continuation-in-part of application No. 08/597,451, Feb. 2, 1996, abandoned.

[51] Int. Cl.[7] .................................................. F04B 17/00
[52] U.S. Cl. .......................... 277/304; 277/361; 417/299; 417/366; 417/319
[58] Field of Search ..................... 417/319, 366, 417/299; 277/304, 361

[56] References Cited

U.S. PATENT DOCUMENTS

| | | |
|---|---|---|
| 1,323,474 | 12/1919 | Hodgkinson . |
| 2,824,759 | 2/1958 | Tracy . |
| 3,378,104 | 4/1968 | Venable . |
| 3,498,620 | 3/1970 | Wiese . |
| 4,170,440 | 10/1979 | Gusmer et al. . |
| 4,558,870 | 12/1985 | Martinez . |
| 4,770,601 | 9/1988 | Crisafulli . |
| 5,145,328 | 9/1992 | Harwath .................................. 417/299 |
| 5,249,812 | 10/1993 | Volden et al. . |
| 5,340,122 | 8/1994 | Toboni et al. . |
| 5,769,427 | 6/1998 | Ostrowski .................................. 277/3 |

FOREIGN PATENT DOCUMENTS 861557  2/1961  United Kingdom .

Primary Examiner—Charles G. Freay
Assistant Examiner—Ehud Gartenberg
Attorney, Agent, or Firm—Frost & Jacobs LLP

[57] ABSTRACT

A mechanical seal combination includes a double mechanical seal and a barrier fluid pump system. A barrier fluid circulating pump 10 is coupled to rotatable shaft 3 so as to derive its motive power from the rotatable shaft. When the rotatable shaft is not running, a by-pass arrangement causes barrier fluids to flow between the barrier fluid header tank 7 and the seal 3, avoiding pump 10, and allowing a thermosyphon effect to be created.

10 Claims, 3 Drawing Sheets

PROCESS PUMP AT REST

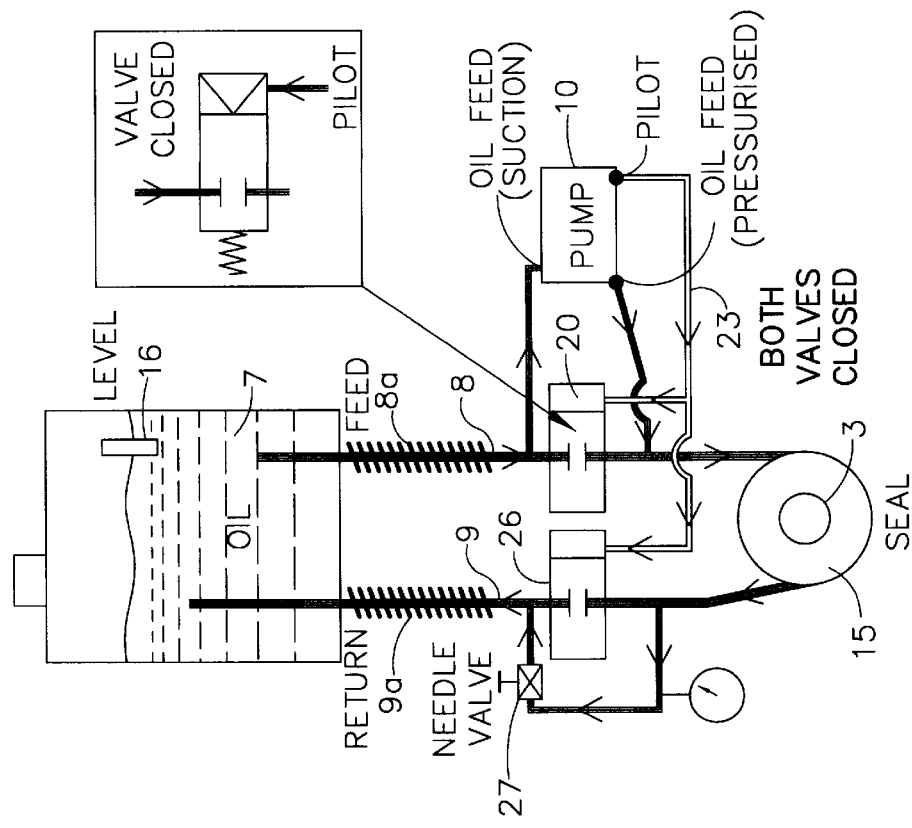
FIG. 4 PROCESS PUMP RUNNING
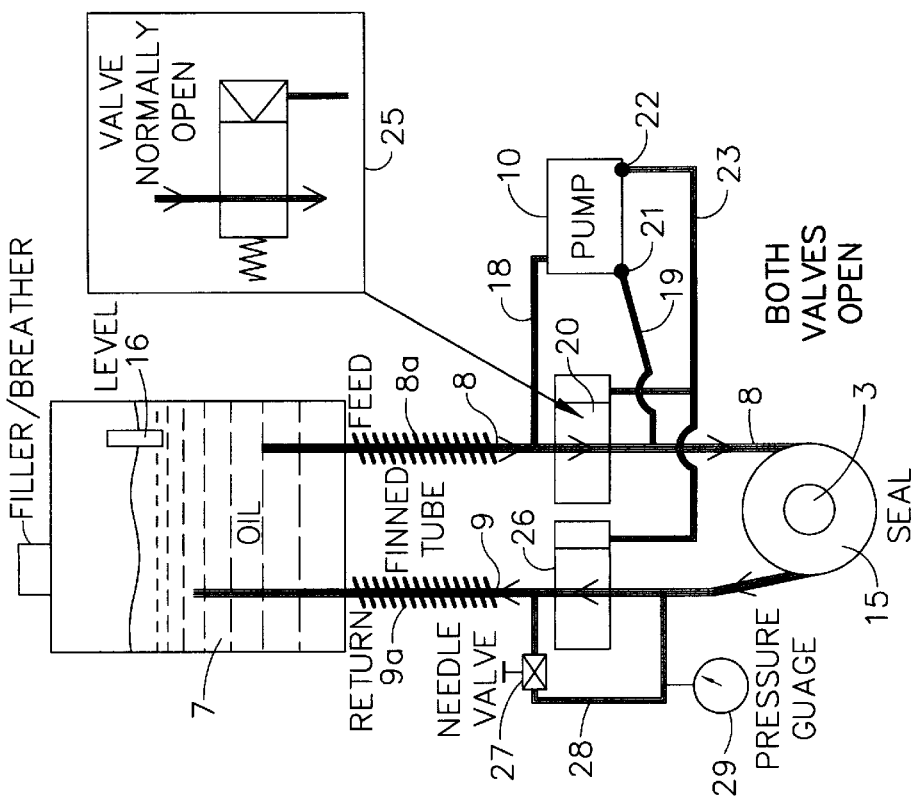
FIG. 3 PROCESS PUMP AT REST

SYSTEM FOR LUBRICATING MECHANICAL SEALS

This application is a Continuation-in-Part of U.S. patent application Ser. No. 08/597,451, filed Feb. 2, 1996 entitled "MECHANICAL SEALS," now abandoned.

TECHNICAL FIELD

This invention relates to improvements in mechanical seals.

BACKGROUND TO THE INVENTION

Double mechanical seals are commonly placed at the interface between a process pump and the rotatable shaft which drives the pump. The double mechanical seal is there to avoid loss of fluid from the pump in the area where the rotatable shaft is inserted into the process pump. The rotatable shaft is usually powered by a motor.

Most double mechanical seals have a cavity defined by the sealing faces, the gland housing and the rotatable shaft through which a barrier fluid is circulated to support the correct running of both sets of faces by cooling the seal. The barrier fluid is stored in a header tank and circulated to the seal by means of inlet and outlet pipes. At present, there are two main systems for circulating the barrier fluid. The first makes use of a thermosyphon and the second a separate circulating pump.

The thermosyphon system allows for heat to be removed from the seal faces by the circulation of water. As the water is heated, it expands and thus becomes less dense than the incoming, cool water. Placing the water outlet from the seal cavity above the inlet ensures that the heated water is ducted out of the seal cavity and escapes back to the header tank. As a result, cool water is drawn in through the water inlet.

It is sometimes preferable to use oil rather than water as the barrier fluid, for example where the product being sealed is incompatible with water. Because oil does not expand sufficiently to thermosyphon when it is heated, it has to be pumped around the system. Barrier fluid also has to be pumped where large amounts of heat have to be removed from the seal, for example where the equipment is being used with explosive chemicals in which the build-up of heat could be extremely hazardous, or where a pressure differential is required to ensure that the barrier fluid is on seal faces and not the product.

In these circumstances, a second motor has been used to drive the barrier fluid pump. However, the use of a second motor can be problematical in areas where there are explosive chemicals, because the propensity of the motors and their electrical connections to cause electrical sparks can be a fire hazard. Furthermore, the use of additional pressurising pumps has historically been extremely expensive, because they are used in hazardous chemical environments and are therefore required to meet stringent safety requirements. The header tank itself, used in the pressurised system, must also be manufactured to ASME VIII standard.

It has been proposed to avoid the necessity of using a second pump and motor by incorporating fins onto that part of the seal which is attached to the rotating shaft or otherwise modifying the shape of the seal cavity to as to allow flow to be induced by the rotation of the shaft. However, it has been found that such designs are rather less effective than might have been hoped and may not perform well enough for critical hazardous chemical systems in that, whilst they create a limited flow, they do not generate enough positive pressure to effect a pressure differential across the seal faces.

SUMMARY OF THE INVENTION

The present invention avoids the need for a second motor in a barrier fluid system which provides pressure, flow and cooling when the rotatable shaft is running, and continued cooling when it is stationery. As a result the life of a double mechanical seal is lengthened by forcing contaminants or vapor from the process end of the mechanical seal, which would otherwise damage it. Heat build up in the seal is avoided thereby maintaining an appropriate running temperature. Temperature control is extremely important in maintaining the long term integrity of any rubber component present in the seal. It is also important in reducing vapor formation at the seal faces which, in the case of toxic or flammable products, can lead to atmospheric contamination or explosion.

A mechanical seal combination in accordance with the present invention comprises:

a double mechanical seal including two seals and a gland housing adapted to receive a rotatable shaft so as to define a cavity for barrier fluid between said two seals, said gland housing and the rotatable shaft;

a header vessel for storing barrier fluid and disposed above the double mechanical seal;

an inlet pipe for directing barrier fluid from the header vessel to the double mechanical seal;

an outlet pipe for recirculating barrier fluid back to the header vessel;

a separate pump for circulating the barrier fluid and located between the header vessel and the inlet;

means for coupling the rotatable shaft to the pump so as to power the pump from the rotatable shaft;

by-pass means operatively connected to the pump so as to be in a first condition, when the pump is running, in which fluid flow is directed through the pump, and in a second condition, when the pump is not running, when fluid flow by-passes the pump, whereby the combination provides pumped fluid to the cavity when the shaft is rotating and thermosyphon supply to the cavity when the shaft is not rotating.

Preferably the combination of the invention further includes:

fluid flow resisting means, located between the outlet and the header vessel; and further by-pass means operatively connected to the pump so as to be in a first condition, when the pump is running, in which fluid flow is directed through the fluid flow resisting means, and in a second condition, when the pump is not running, in which fluid flow by-passes the fluid flow resisting means, whereby the combination provides increased fluid pressure in the cavity when the pump is running.

The by-pass means and the further by-pass means may be two-way valves and the fluid flow resisting means may be a needle valve. The pump is preferably a gear pump. The gear pump may be driven by a continuous flexible drive element, one end of which passes around a driven wheel which provides drive to the gear pump and the other end of which passes round a driving wheel which takes drive from the rotatable shaft. Preferably the driving and driven wheel sizes are chosen to provide at least one of a desired rate of barrier fluid flow and a desired barrier fluid pressure.

Preferably, the pressure of barrier fluid inside the header vessel is lower than that in the inlet pipe.

Preferably the inlet and outlet pipes are finned.

BRIEF DESCRIPTION OF THE DRAWINGS

The accompanying drawings incorporated in and forming a part of the specification illustrate several aspects of the present invention, and, together with the description, serve to explain the principles of the invention. In the drawings:

FIG. 3 is a diagrammatic front view of another arrangement according to the present invention, again with certain items omitted for clarify.

FIG. 4 is a further front view of the arrangement of FIG. 3 showing the arrangement in the alternative mode of operation.

DETAILED DESCRIPTION OF THE PREFERRED EMBODIMENT

Although the arrangement shown in FIGS. 1 and 2 differs in detail from that shown in FIGS. 3 and 4, the important components are essentially the same and will be given the same reference numbers.

Figure 1:
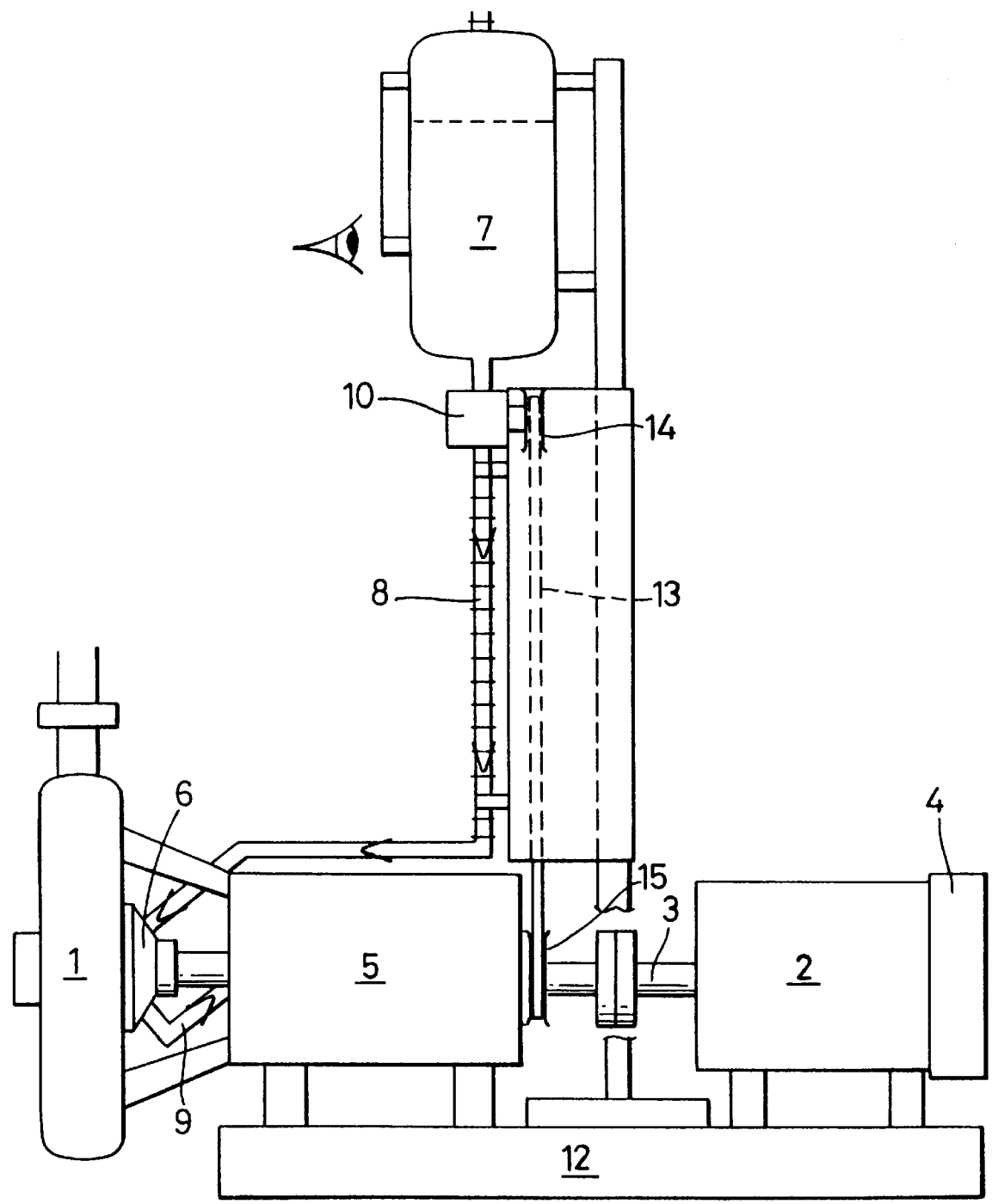
FIG. 1 is a diagrammatic side view of an arrangement according to the present invention although certain items are omitted for clarity.
Figure 2:
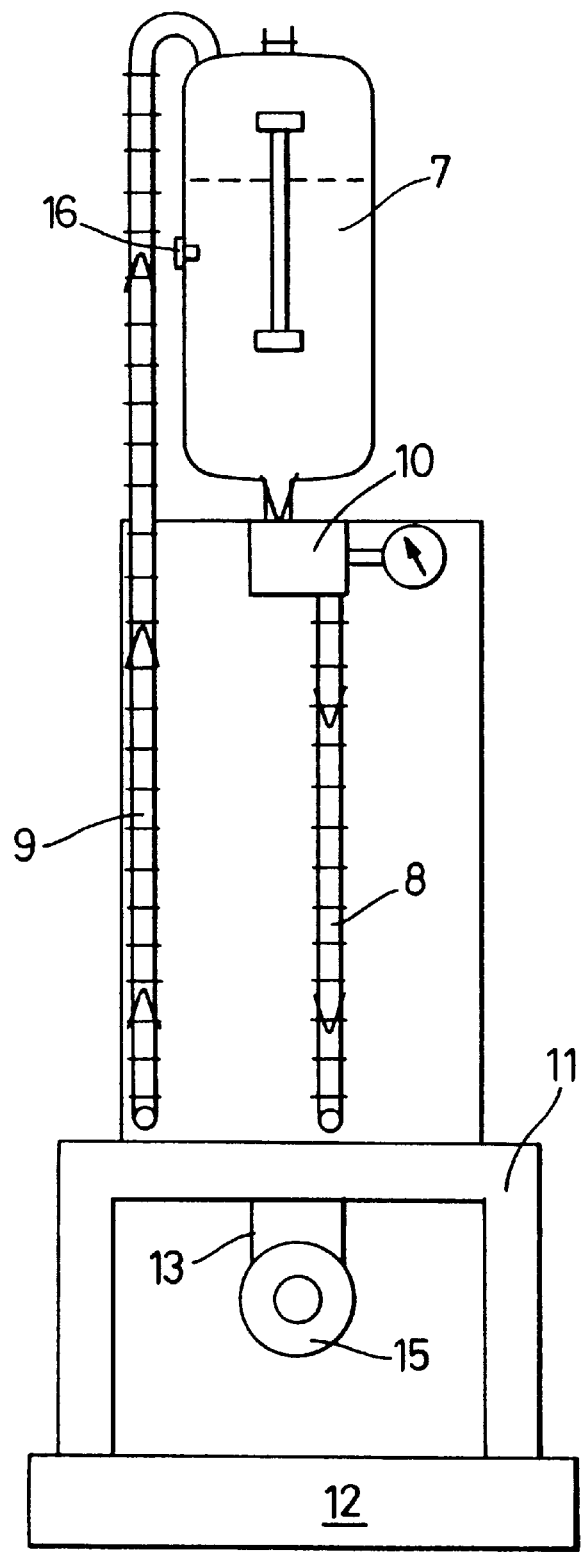
FIG. 2 is a diagrammatic front view of the arrangement shown in FIG. 1 with further items omitted for clarity to show the pulley or sprocket and the belt or chain.

Referring firstly to FIGS. 1 and 2, the arrangement includes a pump 1, bearing house 5 and motor 2 all mounted on a bed plate 12. The bed plate 12 may be metallic, eg steel, or formed from an aggregate such as concrete. Its purpose is to prevent any vibration from one part of the system being propagated to other regions. The process pump 1 is driven by the motor 2 by means of a rotatable shaft 3 connected to the motor 2 by a drive couple/clutch 4. The rotatable shaft passes through the bearing house 5 after which it connects with the pump 1.

A double mechanical seal 6 surrounds the rotatable shaft 3 where it enters the pump 1. The double seal 6 is typical in that it includes inboard and outboard seal faces and a gland housing which, together with the shaft, define an internal cavity through which barrier fluid is allowed to circulate. The barrier fluid is stored in a header vessel or tank 7 and is directed to the double seal 6 by means of a downward inlet pipe 8. The inlet pipe 8 has external copper fins 8a attached to it to increase the rate of heat loss from the barrier fluid. The barrier fluid is recirculated back to the header tank 7 by an outlet pipe 9, provided with fins 9a, which joins the top of the header tank 7. The header tank is mounted on a frame 11 which is rigidly connected to the bed plate 12.

The barrier fluid is circulated by means of a gear pump 10 attached to the inlet pipe 8 below the header vessel 7. The gear pump 10 is driven by a continuous flexible drive element 13, such as a timing belt or chain, one end of which passes around a pulley or sprocket 14 attached to the gear pump 10 and the other end of which passes around a pulley or sprocket 15 attached to the rotatable shaft 3 and positioned directly below the other pulley or sprocket 14. In this way, the rotation of the shaft 3 drives the belt or chain 13 which in turn rotates the pulley 14 thereby driving the gear pump 10.

Appropriate choice of pulley or sprocket sizes can determine the rate of barrier fluid flow and its pressure for the given fixed rotational speed of the shaft 3. The ratio of the rotational speeds of the shaft 3 to the input shaft of pump 10 is determined by the relative sizes of pulleys or sprockets 14 and 15.

Where the process pumping apparatus is installed on sites with potentially explosive chemicals it is vital that barrier fluid should not run low thereby causing the seal 6 to overheat. To guard against this possibility, the header tank 7 includes a probe 16 which controls the process pump motor 2 via an interlock. Should the probe 16 detect that the level of barrier fluid in the header tank 7 is low, the process pump motor 2 is caused to be cut off so as to prevent the seal 6 from running dry.

Referring to FIGS. 3 and 4, similar apparatus is shown to that in FIGS. 1 and 2 but omitting certain items (primarily the process pump, bearing house, gland housing and the connection between the gear pump and the shaft) but certain other items, relating to the hydraulic circuit of the apparatus, are shown in these figures.

In FIGS. 3 and 4, the hydraulic circuit associated with inlet pipe 8 includes two paths which are in parallel. A first path is from the upper part of inlet pipe 8 along conduit 18 through pump 10, along conduit 19 and back to inlet pipe 8. The other path is along inlet pipe 8 through a two-way by-pass valve 20. Pump 10 is provided with two outlets, a first outlet 21 connected to conduit 19 and a second pilot outlet 22 connected to a further conduit 23 which leads to by-pass valve 20. As indicated in the more detailed representation of by-pass 20 shown at 25 lack of oil pressure in conduit 23 is such that by-pass value 20 is in an open condition permitting oil flow through this valve along inlet pipe 8.

Referring to the hydraulic circuit associated with outlet pipe 9, there is again a by-pass valve 26 arranged in parallel with a needle valve 27 so as to provide alternative oil flow paths. By-pass valve 26 is linked to conduit 23 leading to pilot 22 and oil pressure in conduit 23 maintains valve 26 in an open condition allowing oil flow through it. The alternative oil flow route is along conduit 28 taking it through the needle valve 27. The pressure in conduit 28 is monitored by pressure gage 29.

FIG. 3 illustrates the position when the process pump is at rest. In this case the oil flow from header tank 7 is along inlet pipe 8, through open by-pass valve 20 and back to header tank 7 along outlet pipe 9 via by-pass valve 26. When the process pump is running gear pump 10 is caused to run. As a result oil pressure builds up in conduit 23 and causes by-pass valves 20 and 26 to close, preventing flow through them along inlet pipe 8 and outlet pipe 9 respectively. Consequently, oil flow associated with inlet pipe 8 passes entirely through pump 10 and on the outlet side through needle valve 27. The latter is adjusted as necessary to create a pressure in the seal cavity appropriate to the overall process pressure.

It would be appreciated that, with the process pump running, the barrier fluid supply is a pumped supply whereas, when the process pump is at rest the barrier fluid supply is due to the thermosyphon effect. Thermosyphoning allows for continued cooling to take place after the pumped fluid supply ceases.

I claim:

1. A combination comprising:
   a double mechanical seal including two seals and a gland housing adapted to receive a rotatable shaft so as to define a cavity for barrier fluid between said two seals, said gland housing and the rotatable shaft;
   a header vessel for storing barrier fluid and disposed above the double mechanical seal;
   an inlet pipe for directing barrier fluid from the header vessel to the double mechanical seal;

an outlet pipe for recirculating barrier fluid back to the header vessel;

an auxiliary pump for circulating the barrier fluid and located between the header vessel and the inlet;

means for coupling the rotatable shaft to the pump so as to power the pump from the rotatable shaft;

by-pass means operatively connected to the pump so as to be in a first condition, when the pump is running, in which fluid flow is directed through the pump, and in a second condition, when the pump is not running, when fluid flow by-passes the pump, whereby the combination provides pumped fluid to the cavity when the shaft is rotating and thermosyphon supply to the cavity when the shaft is not rotating.

2. A combination according to claim 1 and further including:

fluid flow resisting means, located between the outlet and the header vessel; and further by-pass means operatively connected to the pump so as to be in a first condition, when the pump is running, in which fluid flow is directed through the fluid flow resisting means, and in a second condition, when the pump is not running, in which fluid flow by-passes the fluid flow resisting means, whereby the combination provides increased fluid pressure in the cavity when the pump is running.

3. A combination according to claim 2 in which said by-pass means and said further by-pass means are two-way valves.

4. A combination according to claim 2 in which the fluid flow resisting means is a needle valve.

5. A combination according to claim 2 in which the pump is a gear pump.

6. A combination according to claim 5 in which the gear pump is driven by a continuous flexible drive element, one end of which passes around a driven wheel which provides drive to the gear pump and the other end of which passes around a driving wheel which takes drive from the rotatable shaft.

7. A combination according to claim 6 in which the driving and driven wheel sizes are chosen to provide at least one of a desired rate of barrier fluid flow and a desired barrier fluid pressure.

8. A combination according to claim 2 wherein said pump has an input shaft and wherein a ratio of rotational speeds of said input shaft and said rotatable shaft is established by said means for coupling, said ratio being chosen to provide at least one of a desired rate of barrier fluid flow and a desired barrier fluid pressure.

9. A combination according to claim 2 in which the pressure of barrier fluid inside the header vessel is lower than that in the inlet pipe.

10. A combination according to claim 2 in which the inlet and outlet pipes are finned.

\* \* \* \* \*